Oct. 23, 1956  R. K. LANDON  2,768,023
PLASTIC TOP CONSTRUCTION FOR MOTOR VEHICLES
Filed Dec. 27, 1954
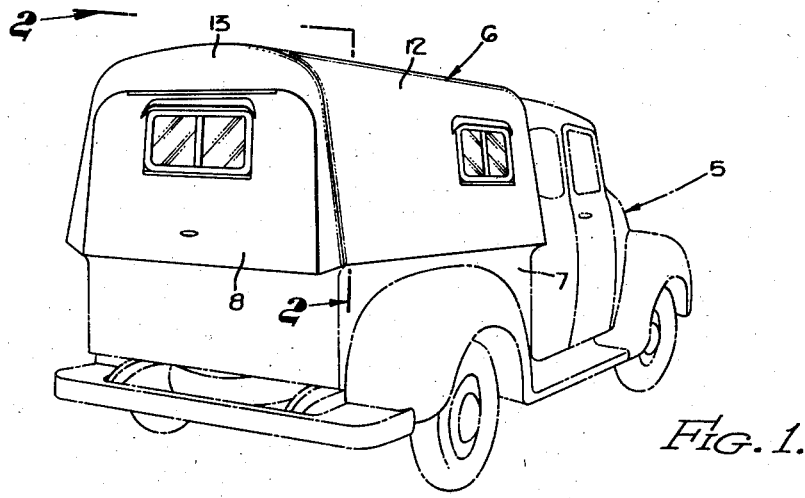
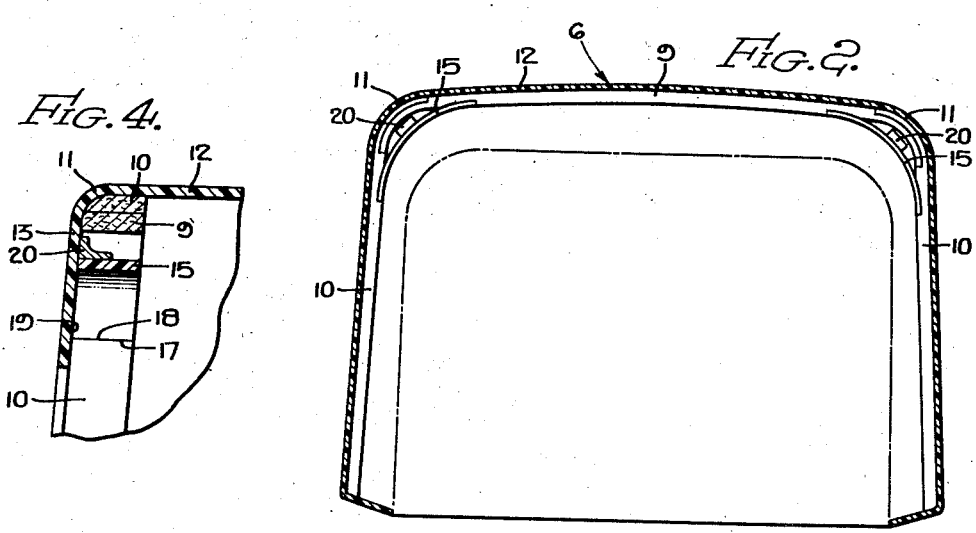
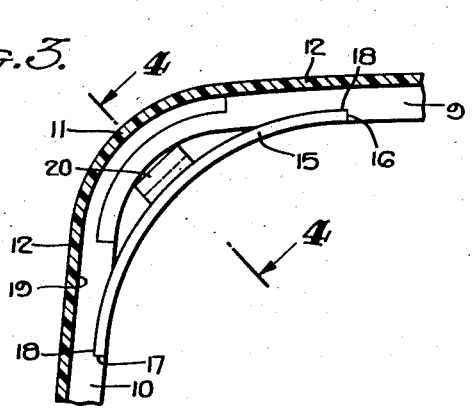
ROBERT KENT LANDON,
INVENTOR.
BY
AGENT

United States Patent Office 2,768,023
Patented Oct. 23, 1956

2,768,023

PLASTIC TOP CONSTRUCTION FOR MOTOR VEHICLES

Robert Kent Landon, Costa Mesa, Calif., assignor to Glas-Laminates, Inc., Costa Mesa, Calif., a corporation of California Application December 27, 1954, Serial No. 477,731

5 Claims. (Cl. 296—28)

This invention relates to the construction of tops for motor vehicles and particularly relates to means for strengthening the corners of plastic tops. Tops made of fiberglass or like materials have become widely used on pick-up trucks and panel trucks, converting such vehicles into enclosed trucks for camping and other personal uses and for carrying goods which may be affected by weather. The tops are generally removable, being bolted or otherwise temporarily fastened to the truck bodies when in use. Often they have a modulus of elasticity which differs widely from that of the chassis or body to which they are attached. Often the mode of attachment permits them to vibrate excessively. From both or either of these causes, the sheet plastic material of which the tops are constructed frequently develops cracks, these cracks usually occurring where the plastic material is bent or where two planes of plastic material are joined at a corner.

It is an object of this invention to provide strengthening means whereby the stresses usually occurring at corners and bends of a plastic vehicle top are withstood by inserted material having substantially the same degree of elasticity as the plastic sheathing from which the top is constructed.

Another object of the invention is to provide a construction for plastic motor vehicle tops or bodies which permits the top or body to transmit stress to a curved member of less curvature than the nearest corner or bend of the top or body, whereby the member having the greater curvature and under stress or shear strain in relation to an adjacent plane surface, is supported by and receives strength from a member braced to resist in directions opposite to the stresses received by it.

The invention is carried out by a novel form of bracing, in which a curved brace and an L-shaped brace, joined together, cooperate to strengthen the curved structure of a rounded top and a flat structure such as an adjacent end of the vehicle body.

In the accompanying drawing, illustrative of one form of motor vehicle body and of a bracing system suitable therefor, Figure 1 is a rear view of a pick-up truck fitted with a body suitable for camping trips and is illustrative of the junction of curved and plane plastic sheet material at corners of the body.

Fig. 2 is a vertical transverse sectional view on the plane of section 2—2 of Fig. 1, illustrating the structure of frames, plastic covering, and braces immediately within the rear panel of the truck;

Fig. 3 is an enlarged view of one corner of Fig. 2, illustrative of the manner of applying braces to the frame and plastic covering;

Fig. 4 is a vertical longitudinal sectional view on the plane of section 4—4 of Fig. 3; and Fig. 5 is a view similar to Fig. 4, showing the double brace system applied to a transverse frame intermediate of the truck top, Having reference to the details of the drawings, I have shown in Fig. 1, a pick-up truck 5 on which a camping top 6 has been secured by bolting or otherwise fastening it to the sides 7 of the truck body. A truck of the kind shown will ordinarily be entered from the rear and is therefore shown with a door 8 hinged along its upper margin so that it may swing outward and upward and serve as an extended canopy. The interior construction of such a truck is best illustrated in Figs. 2 and 3, showing transverse frames 9 supported by vertical frames 10 to which their ends are spliced at the upper corners 11. The frames 9 and 10 will ordinarily be made of wood, to obtain better adhesion than metal affords, of plastic material bonded to them, but they may be made of continuous plastic rod or bar material. The spliced ends at the corners 11 are simply for the purpose of saving steam-bending in wooden construction.

A fiberglass skin 12, composed of glass fiber cloth and mat, may be stretched over the frames 9 and 10 and impregnated with resin so as to bond it to the frames. Additional cloth 13 may be attached to the rear side of the rearmost of the frames 9 and 10 and impregnated with resin so as not only to bond it to the frames but also to bond it and join it smoothly and integrally with the impregnated glass cloth 12. The fiberglass cloth 13 then forms the rear panel of the top 6, in which the door 8 is hinged. When so constructed the frames 9 and 10 impart no structural strength to the top 6, but serve only as means for stretching the cloth while it is being impregnated. In fact it is not essential that they extend all the way to the curve of the impregnated glass sheet 12. The top 6 may in some instances be formed in an inverted mold, in which case the frames 9 and 10 serve principally as members adhering to the impregnated glass structure to hold the latter in the mold and for withdrawing it from the mold.

As described to this point, the construction of the top 6 is conventional, and results in a curved roof and a flat rear panel integrally united and self-supporting even in the absence of the frames 9 and 10, with provision for a door in the rear panel. However, such a construction is inherently weak at the junction of the flat and the curved surfaces at the corners 11 and at the corresponding corners which frame the door 8. Road torsions and vibrations may cause cracks in the impregnated fiberglass at these points. I therefore insert braces 15 at the corners, so shaped and inserted as to give considerable additional strength to the corners. The braces 15 are flat strips, curved to a curvature of greater radius than the corners 11, and inserted to be substantially tangent to the tangents to the corners 11 made by the frames 9 and 10. The braces are preferably of laminated stock, impregnated with the same resin as the fiberglass of the top 6 or a resin which will bond therewith. The ends 16 and 17 of the braces 15 are secured respectively to the frames 9 and 10 so as to have a considerable portion of their outer curvature surface in contact with the frames, and for this purpose the frames may be recessed as shown at 18 in Fig. 3. The ends of the braces may be installed at the corners 11 of any of the transverse frames of the top 6, as hereinafter shown. To the braces adjacent the rear panel cloth 13, I apply resin to the edges 19 adjacent the panel cloth 13 to cause those edges to adhere bondedly to the panel cloth. The ends of the braces in the recesses 18 may also be secured therein by an application of resin which will bond with resin of the braces and with the wood of the frames.

At approximately the center of each of the braces 15 is a second brace 20 which is L-shaped. The braces 20 are also preferably of resin-laminated stock, and each has one leg bonded by resin to the outer curvature surface of the respective brace 15, and the other leg bonded by resin to the rear panel cloth 13.

In Fig. 5, I have shown an application of my double brace system to a transverse frame not associated with the rear panel 13 but intermediate of the length of the truck top 6. Such a brace system naturally can brace only associated frames and the fiberglass cover on the top and sides of the truck body, but is very effective when the curvature of the frames 9 and 10 and of the cover 12 are sharp. The arched brace 15 has its ends recessed in the frames 9 and 10 so that it follows a more gradual arch, as heretofore explained. Taking the place of the rear panel 13, a segment of laminated resinous material 22 is bonded to the frames 9 and 10 and has an inner curved edge 23 which follows the edge 19 of the arched brace 15 and is bonded thereto. An L-shaped brace 24 is bonded to the segment 22 and to the arched brace 15, the outer side of the angle of the brace 24 being utilized as bonding surface. In this manner an efficient bracing system may be applied, strengthening the bend of the fiberglass cover 12, without occupying more headroom within the truck body than is taken up by the arched brace 15 itself.

Thus, although the cross-frames of the truck-top 6 ordinarily impart no structural strength except to resist a heavy blow on the outside of the top, the resinated fiberglass being ordinarily self-supporting, I have brought these frames into a structural relationship with the fiberglass at the points of greatest danger of cracking. The arched braces 15 are clear and separate from the frames 9 and 10 at their centers, but are secured thereto at their ends. Any stress upon the frames tending to bow the arched braces outward is resisted by having the ends 16 and 17 secured in the recesses 18; an outward bow would necessitate a double reverse bend which the laminated resinous structure of the braces resists. Any stress tending to flatten the arch of the braces 15 is resisted by the braces 20 or 24, and by the whole length of the bonded edges 19 of the braces 15, a radial compression upon the flat rear panel. Buckling of the rear panel under such stress or any other stress is resisted by the frames 9 and 10 to which the stress is transmitted by the braces. Thus each of the corners 11 is protected from cracking or shearing under stresses applied thereto from any direction, and at intermediate frames along the truck body the curve connecting the roof and sides of the body is fully supported.

I claim:

1. In an automotive vehicle body having a curved plastic covering external to a frame forming an internal corner and a second substantially flat plastic covering secured to a side of said frame so as to form an enclosed corner with said first covering, said two coverings being integrally joined to form a continuous surface, bracing means for said coverings comprising a curved brace having a radius of curvature greater than the radius of curvature of said frame and having its ends secured to said frame at opposite sides of said corner and a second brace of L-shaped cross-section having one leg secured to said curved brace and the other leg secured to said flat plastic covering.

2. In an automotive vehicle body having a curved plastic covering external to a frame forming an internal corner, bracing means for said covering comprising a curved brace having a radius of curvature greater than the radius of said frame and lying in the same vertical plane as said frame and having its ends inset into said frame on both sides of the curve of said frame, a substantially flat member secured to one side of the curve of said frame and extending there below, one edge of said curved brace being bonded to said flat member, and a second brace, L-shaped in cross-section, having one leg secured to said curved brace between said ends thereof and the other leg secured to said flat member.

3. In an automotive vehicle body as set forth in claim 2, in which said curved brace and said L-shaped brace are of plastic material, said L-shaped brace being bonded to said flat member.

4. In an automotive vehicle body having a curved plastic covering external to a curved frame, bracing means for the internal curve formed by said covering and frame comprising a curved brace having a radius of curvature greater than the radius of said frame and lying in the same vertical plane as said frame and having its ends inset into said frame at each side of the curve of said frame so as to be substantially aligned with portions of said frame tangent to the curve thereof, end portions of the exterior curvature surface of said brace being in contact with said frame at each end of said brace, and the center portion of said brace being separated from said frame, whereby end thrust on the ends of said brace exerts a bowing tendency on said brace which is resisted by said end portions.

5. In an automotive vehicle body, the bracing structure set forth in claim 4, and an L-shaped brace having one leg rigidly connected to said curved brace intermediate of said end portions and the other leg rigidly connected to said frame.

References Cited in the file of this patent

UNITED STATES PATENTS

| | | |
|---|---|---|
| 1,055,714 | Craig | Mar. 11, 1913 |
| 1,462,329 | Dennis | July 17, 1923 |
| 1,729,555 | Sparshatt | Sept. 24, 1929 |
| 2,600,140 | Torseth | June 10, 1952 |
| 2,645,521 | Judson | July 14, 1953 |

FOREIGN PATENTS

| | | |
|---|---|---|
| 594,310 | France | Sept. 10, 1925 |